United States Patent [19]

Shea et al.

[11] Patent Number: 4,814,392

[45] Date of Patent: Mar. 21, 1989

[54] SILICONE-POLYARYLENE ETHER BLOCK COPOLYMERS, AND METHOD FOR MAKING

[75] Inventors: Timothy J. Shea, Schenectady; John R. Campbell, Clifton Park; Dwain M. White, Schenectady; Laura A. Socha, Troy, all of N.Y.

[73] Assignee: General Electric Company, Schenectady, N.Y.

[21] Appl. No.: 125,090

[22] Filed: Nov. 25, 1987

[51] Int. Cl.[4] .................... C08F 283/08; C08G 65/48
[52] U.S. Cl. .................................... 525/391; 525/393; 525/397; 525/905; 525/474; 528/26; 528/38
[58] Field of Search ............... 525/391, 393, 905, 397, 525/474, 477; 528/26, 38

[56] References Cited

U.S. PATENT DOCUMENTS

| | | | |
|---|---|---|---|
| 3,539,655 | 11/1970 | Strachan et al. | 525/905 |
| 3,539,656 | 11/1970 | Noshay et al. | 525/905 |
| 3,539,657 | 11/1970 | Noshay et al. | 525/905 |
| 3,558,741 | 11/1971 | Holub et al. | 525/905 |
| 3,668,273 | 6/1972 | Krantz | 525/393 |
| 3,737,479 | 6/1973 | Haaf | 525/393 |
| 3,960,985 | 6/1976 | Cooper | 525/393 |
| 4,090,996 | 5/1978 | Gergen et al. | 525/92 |
| 4,642,358 | 2/1987 | Aycock et al. | 549/295 |
| 4,690,997 | 9/1987 | Cella et al. | 528/26 |

OTHER PUBLICATIONS

Chalk, A. J., Hoogeboom, T. J., "Anionic Graft Polymerization of Lithiated Poly-(2,6-dimethyl-1,4-phenylene Ether)", Journal of Polymer Science: Part A-1, vol. 7 (1969), pp. 2537-2545.

Primary Examiner—Lewis T. Jacobs
Assistant Examiner—Dean, Jr. R.
Attorney, Agent, or Firm—William A. Teoli; James C. Davis, Jr.; James Magee, Jr.

[57] ABSTRACT

Silicone-polyarylene ether block copolymers are provided which can be made by effecting reaction between amino terminated polydiorganosiloxane and anhydride functionalized polyarylene ether.

7 Claims, No Drawings

SILICONE-POLYARYLENE ETHER BLOCK COPOLYMERS, AND METHOD FOR MAKING

BACKGROUND OF THE INVENTION

Prior to the present invention as shown by A. J. Chalk et al., Journal of Polymer Science, Part A-1, Vol. 7 (1965) pp. 2537-2545, silicone-polyarylene ether copolymers were made by anionic graft polymerization of lithiated poly(2,6-dimethyl-1,4-phenylene ether) with hexamethylcyclotrisiloxanes. In addition, Krantz, U.S. Pat. No. 3,668,273, assigned to the same assignee as the present invention and incorporated therein by reference, shows the synthesis of silicone-polyarylene ether block copolymers by effecting reaction between a hydroxy-terminated polyphenylene ether and an amino-terminated polydiorganosiloxane. The resulting organopolysiloxane-polyphenylene ether block copolymer is comprised of chemically combined polyphenylene ether blocks joined to polydiorganosiloxane blocks by silicon-oxygen-phenyl bonds.

Organopolysiloxanes have also been copolymerized with polyarylene polyether copolymers as shown by Strachen et al., U.S. Pat. No. 3,539,655, and Noshay et al., U.S. Pat. No. 3,539,656. The aforementioned siloxane-polyarylene polyether copolymers are reported as being hydrolytically stable as distinguished from copolymers having aryloxy-silicon linkages.

The present invention is based on our discovery that trimellitic anhydride acid chloride-modified polyphenylene ethers, referred to hereinafter as "PPE-TAAC", as shown by Aycock et al., U.S. Pat. No. 4,642,358, assigned to the same assignee as the present invention and incorporated herein by reference can be directly reacted with an amine-terminated polydiorganosiloxane to produce a polyphenylene ether-polydiorganosiloxane block copolymer having improved impact strength as compared to the starting polyphenylene ether referred to hereinafter as "PPE". In addition, unlike the silicone-polyether block copolymers of the prior art, the silicone-polyether copolymers of the present invention comprise polyphenylene ether blocks joined to silicone blocks by silicon imide linkages. It also has been found that substantially similar results can be obtained by effecting reaction between polyphenylene ether which has been modified with maleic anhydride referred to hereinafter as PPE-MA by coextruding a mixture of polyphenylene ether and maleic anhydride as described hereinafter.

STATEMENT OF THE INVENTION

There is provided by the present invention, silicone-polyarylene ether block copolymers comprising by weight 30 to 99% of polyarylene ether blocks chemically combined to 70 to 1% of silicone blocks by silicon-imide linkages.

In another aspect of the present invention, there is provided a method for making silicone-polyarylene ether block copolymers which comprises effecting reaction between amine-terminated polydiorganosiloxane and polyarylene ether having chemically combined anhydride groups of the formula,

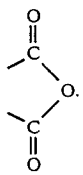

The polyphenylene ethers which can be utilized in the practice of the present invention to make PPE-TAAC or PPE-MA having chemically combined groups of formula (1), comprise a plurality of structural units having the formula,

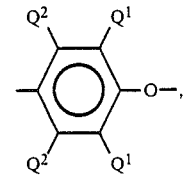

where in each of said units, independently, each $Q^1$ is halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are known. The homopolymers include those containing, for example, 2,6-dimethyl-1,4-phenylene ether units. The copolymers include random copolymers containing such units in combination with (for example) 2,3,6-trimethyl-1,4-phenylene ether units. Many suitable random copolymers, as well as homopolymers, are disclosed in the patent literature.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other polyphenylene ethers are coupled polymers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

Catalyst systems containing a copper compound are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Other catalyst systems contain manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also known are cobalt-containing catalyst systems. Suitable manganese and cobalt-containing catalyst systems for polyphenylene ether preparation are known in the art by reason of disclosure in numerous patents and publications.

PPE-TAAC can be made in accordance with the procedure shown by Aycock et al., U.S. Pat. No. 4,642,358, assigned to the same assignee as the present invention and incorporated herein by reference. For example, a polyphenylene ether is reacted with a compound having an acyl functional group such as trimellitic anhydride acid chloride. PPE-MA can be made by coextruding polyphenylene ether as previously described, with maleic anhydride on a Welding Engineer's twin-screw extruder. There can be used from 0.1 to 5 parts by weight of maleic anhydride per 100 parts of polyphenylene ether. The extruder can be operated at a temperature of from 550° to 650° F. and pressure of 0 to 2000 psi.

The amine-terminated polydiorganosiloxanes which can be used in the practice of the present invention to make the polyphenylene oxide silicone block copolymers are included by the formula,

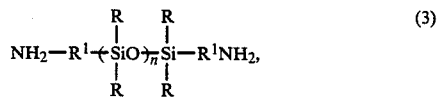

(3)

where R is a $C_{(1-14)}$ monovalent hydrocarbon radical or $C_{(1-14)}$ monovalent hydrocarbon radical substituted with 1–4 radicals, or mixtures thereof, inert during intercondensation, $R^1$ is a $C_{(1-14)}$ divalent hydrocarbon radical or substituted $C_{(1-14)}$ divalent hydrocarbon radical substituted with from 1–4 radicals or mixtures thereof inert during intercondensation, and n is an integer having an average value of from about 3 to 500 inclusive, and preferably 50 to 400. $R^1$ is preferably $C_{(1-14)}$ polymethylene.

Procedures for making the aminoorgano terminated polydiorganosiloxane of formula (1) are well known in the art. For example, aminoorganotetraorganodisiloxane can be equilibrated with an octaorganocyclotetrasiloxane, such as octamethylcyclotetrasiloxane, to increase the block length of the polydiorganosiloxane. The corresponding aminoorganotetraorganodisiloxane, such as aminobutyltetramethyldisiloxane can be made by the procedure shown by Prober, U.S. Pat. No. 3,185,719, assigned to the same assignee as the present invention. Prober reacts allylcyanide with dimethylchlorosilane and then hydrolyzes the resulting cyanopropyldimethylchlorosilane in the presence of sodium bicarbonate to produce the 1,3-bis-γ-cyanopropyltetramethyldisiloxane which then can be reduced with hydrogen in the presence of Raney nickel to yield 1,3-bis-γ-aminobutylteramethyldisiloxane. In a similar manner, 1,3-aminopropyl terminated polydimethylsiloxane can be obtained by the equilibration of 1,3-bis-γ-aminopropyltetramethyldisiloxane which is prepared by utilizing acrylonitrile in a manner similar to that shown for the production of aminobutyltetramethyldisiloxane utilizing allylcyanide.

A silicone-polyarylene ether block copolymer of the present invention can be transparent or translucent depending upon the proportions by weight of the polyarylene ether blocks and the silicone blocks. The block copolymers can be cast or molded and can be used as a compatibilizer for blends of silicone and polyphenylene ether where the block copolymer can be used at up to 20 percent by weight of the total weight of silicone, polyphenylene ether, and silicone-polyarylene ether block copolymer, or in a variety of applications such as membranes, transparent films, injection moldable high performance thermoplastic insulators, coatings, or copper or aluminum wire. Other applications requiring a flame retardant temperature-resistant material are also included. The silicone-polyarylene ether block copolymers can be reinforced with various inert fillers such as silica filler, glass fiber, carbon fiber, in proportions from 1 to 40 parts of filler per 100 parts by weight of the silicone-polyarylene ether block copolymer.

The silicone-polyarylene ether block copolymers can be made by a solution technique utilizing an inert organic solvent such as chloroform, toluene and chlorobenzene under inert conditions utilizing, for example, nitrogen or a noble gas such as argon. The PPE-TAAC or PPE-MA is refluxed with the amine-terminated polydiorganosiloxane with stirring over a period of from 1 to 40 hours. There can be utilized sufficient PPE-TAAC or PPE-MA or a mixture thereof to provide substantially equal molar amounts of anhydride functional groups of formula (1) per amine group of the amine-terminated polydiorganosiloxane. After imidization has been completed, the mixture can be allowed to cool to room temperature and the block copolymer precipitated in a solvent such as acetone. Block copolymer can then be filtered and dried in vacuo in accordance with standard techniques. If desired, the block copolymer can be separated from unreacted amine-terminated polydiorganosiloxane by methylene chloride complexation. This procedure can be carried out as follows: A 5% by weight solution of block copolymer is prepared in warm methylene chloride. The solution is cooled to a temperature of about 32° F. for two hours. The resulting precipitate is recovered and the filter cake is washed with cold methylene chloride and dried in a vacuum oven. The resulting material is free of unreacted polysiloxane.

Alternatively, the silicone polyphenylene ether block copolymer can be made by a melt reaction synthesis of the anhydride functionalized polyphenylene ether and the amine-terminated polydiorganosiloxane. Depending upon the block length of the amine-terminated polydiorganosiloxane, various proportions of the anhydride-functionalized polyphenylene ether and amine-terminated polydiorgano-siloxane can be used. The reaction can be conducted under an inert atmosphere, such as nitrogen, and the mixture heated to a temperature in the range of from 250° C. to 350° C. with stirring. After a short period of time, such as 0.5 to 5 minutes of stirring, the mixture can be allowed to cool, dissolved in an organic solvent such as chloroform and precipitated in an appropriate organic solvent such as methanol. Reprecipitation of the block copolymer can be effected from such solvents as toluene with methanol followed by drying. The compositions of the block copolymer can be determined by comparing NMR resonances of polyphenylene ether monomer and methyl peaks of the polydiorganosiloxane in samples precipitated from methylene chloride.

In order that those skilled in the art would be better able to practice the present invention, the following examples are given by way of illustration and not by way of limitation. All parts are by weight.

EXAMPLE 1

A mixture of 1000 ml of toluene, 85 grams of a PPE-TAAC having an intrinsic viscosity of about 0.6 in chloroform at 25° C., and 23 grams of an amine-terminated polydimethylsiloxane (DP=200) was refluxed for 4 hours, cooled to room temperature and precipitated into acetone. The filter cake was then dried in vacuo for about 12 hours at 70° C. Based on method of preparation, there was obtained a polyphenylene ether polydimethylsiloxane block copolymer having a number average molecular weight of about 30,000 where the polyphenylene ether blocks were joined to the polydimethylsiloxane blocks by imide linkages.

Polyphenylene ether polydimethylsiloxane block copolymer was separated from unreacted amine-terminated polydimethylsiloxane by methylene chloride complexation as previously described.

The polyphenylene ether polydimethylsiloxane block copolymer was compression molded on a Wabash-125 ton press (with plates set at 625° F.) at 12,000 ft./pounds for 5 minutes. The molded plaque was then sectioned and test specimen machined to the desired dimensions. Notched Izod and tensile properties were determined as per ASTM Bulletin No. D256 and No. D638, respectively. Cast films were also prepared by dissolving the polyphenylene ether polydimethylsiloxane copolymer in chloroform at 5% solids and then slowly evaporating the solvent. Films were formed on a press equipped with thermal plates (preheated to 550° F.). The metal disk mold filled with 0.25 grams of copolymer was covered with aluminum sheeting and set into the press for about 2.5 minutes at 5000 psi. The film was then immediately quenched in a cold water bath.

EXAMPLE 2

A mixture of 2 grams of PPE-MA and 3 grams of an amine-terminated polysiloxane (DP=300) was heated under sealed conditions in a nitrogen atmosphere to a temperature of 300° C. Within 4.5 minutes, the temperature of the mixture reached 270° C. and the mixture was held at 270°-290° C. for 3 minutes while it was stirred continuously. The product was then allowed to cool, dissolved in chloroform and precipitated with methanol. The product was then reprecipitated from toluene with methanol and then dried. The composition of the product was determined by $^1$H-NMR.

Methylene chloride complexation is used to determine whether the polydimethylsiloxane blocks were bound to the polyphenylene blocks. The complexes that precipitated from methylene chloride contained polydimethylsiloxane as well as polyphenylene ether. Based on method of preparation and the aforementioned spectral and methylene-chloride complexation procedure, the product was a silicone polyether block copolymer having a number average molecular weight of about 40,000 and consisting essentially of chemically combined polyphenylene ether blocks joined to polydimethylsiloxane blocks by imide linkages.

EXAMPLE 3

Following the procedures of Examples 1 and 2, a series of silicone-polyphenylene ether block copolymers were prepared using PPE-TAAC and PPE-MA of functionalized polyphenylene ether and polydimethylsiloxane having an average DP in the range of from about 18–300. The following results were obtained using the solution copolymer technique:

TABLE 1

| | | Solution Copolymer Preparation | | | |
|---|---|---|---|---|---|
| | | % Silicone in | Films | | Intrinsic |
| PPE—Anhydride | Siloxane DP | Copolymer | Cast | Pressed | Viscosity (dl/g) |
| PPE—TAAC | 100 | 9 | transparent | transparent | 0.75 |
| PPE—TAAC | 200 | 13 | transparent | transparent | — |
| PPE—g-MA (1.6%) | 50 | 10 | transparent | transparent | 0.81 |
| PPE—g-MA (1.6%) | 100 | 17 | transparent | transparent | — |
| PPE—g-MA (1.6%) | 200 | 21 | transparent | transparent | 0.69 |
| PPE—g-MA (1.0%) | 100 | 10 | transparent | transparent | — |
| PPE—g-MA (2.5%) | 100 | 18 | transparent | transparent | — |

The following results were obtained using the melt copolymer technique:

TABLE 2

| | | | Melt Copolymer Preparation | | | | | |
|---|---|---|---|---|---|---|---|---|
| | | | [PPO]/[Siloxane] | | % Siloxane | | | |
| Sample | | | Mole Ratio | | | | | |
| No. | PPE | Siloxane | | Found | | Found | Film Appearance | |
| (a) | Type | DP | Cal'd | (b) | Cal'd | (b) | Molded | Cast |
| 90B-A | PPE—TAAC | 300 | 1 | 2 | 60 | 42 | Opaque | V Sl Hazy |

TABLE 2-continued

| | | | Melt Copolymer Preparation | | | | | |
|---|---|---|---|---|---|---|---|---|
| | | | [PPO]/[Siloxane] | | % Siloxane | | | |
| Sample | | | Mole Ratio | | | | | |
| No. | PPE | Siloxane | | Found | | Found | Film Appearance | |
| (a) | Type | DP | Cal'd | (b) | Cal'd | (b) | Molded | Cast |
| 90B-AM | PPE—TAAC | 300 | 1 | 2 | 60 | 42 | Opaque | Clear |
| 90B-B | PPE—TAAC | 300 | 2 | 2.3 | 43 | 40 | Opaque | V Sl Hazy |
| 90B-BM | PPE—TAAC | 300 | 2 | 4 | 43 | 26 | Transl | Clear |
| 90B-C | PPE—TAAC | 18 | 1 | 1.2 | 10 | 9 | Transl | Clear |
| 90B-CM | PPE—TAAC | 18 | 1 | 2 | 10 | 6 | Clear | Clear |
| 90B-D | PPE—TAAC | 18 | 2 | 1.5 | 5 | 6 | Transl | Clear |
| 90B-DM | PPE—TAAC | 18 | 2 | 1.7 | 5 | 6 | Clear | Clear |
| 67-B | PPE—g-MA (1%) | 300 | 1 | 1.1 | 60 | 57 | Opaque | Sl Hazy |
| 67-BM | PPE—g-MA (1%) | 300 | 1 | 2.0 | 60 | 29 | — | Clear |
| 67-C | PPE—g-MA (1%) | 300 | 2 | 1.6 | 43 | 53 | — | Clear |
| 67-CM | PPE—g-MA (1%) | 300 | 2 | 3.2 | 43 | 27 | — | Clear |
| 67-A | PPE—g-MA (1%) | 18 | 1 | 1.8 | 10 | 6 | Clear | Hazy |
| 67-AM | PPE—g-MA (1%) | 18 | 1 | 2.6 | 10 | 4 | Clear | — |
| 67-D | PPE—g-MA (1%) | 18 | 2 | 2.0 | 5 | 5 | Clear | Clear |
| 67-DM | PPE—g-MA (1%) | 18 | 2 | 2.3 | 5 | 4 | Clear | Clear |
| 134-4 | PPE—g-MA (2.5%) | 300 | 1 | 1.3 | 60 | 42 | Opaque | Sl Hazy |
| 134-3 | PPE—g-MA (2.5%) | 300 | 1.5 | 1.5 | 49 | 49 | Opaque | Hazy |
| 134-2 | PPE—g-MA (2.5%) | 18 | 1 | .7 | 10 | 14 | Clear | Clear |
| 134-2n | PPE—g-MA (2.5%) | 18 | 1 | 1.2 | 10 | 8 | Clear | Clear |
| 134-1 | PPE—g-MA (2.5%) | 18 | 1.5 | 1.5 | 6 | 6 | Transl | Clear |
| 134-1n | PPE—g-MA (2.5%) | 300 | 1.5 | 2.2 | 6 | 4 | Transl | Clear |

(a) M denotes the isolated methylene chloride precipitate
(b) From $^1$H—NMR analysis Specimens were prepared from compression molded plaques and further evaluated for notched Izod (ft./pounds/in.), tensile strength (psi), and elongation (%). The following results were obtained:

TABLE 3

| | | Copolymer Properties* | | |
|---|---|---|---|---|
| Entry | PPE in Copolymer | % Silicone in Copolymer | Notched Izod (ft lbs/in) | Tensile Strength (psi) | % Elongation |
| 1 | PPE (control) | — | 0.8 | 15,478 | 21 |
| 2 | PPE—g-MA** | 9 | 1.9 | 11,297 | 22 |
| 3 | PPE—g-MA*** | 18 | 3.8 | 6,167 | 16 |
| 4 | PPE—TAAC | 9 | 3.5 | 8,627 | 31 |
| 5 | PPE—TAAC | 13 | 5.9 | 18,741 | 19 |

*Test specimens prepared from compression molded plaques
**PPE/MA weight ratio of 100:1.6, polysiloxane DP = 50
***PPE/MA weight ratio of 100:1.6, polysiloxane DP = 200

The above results show that the silicone polyphenylene ether block copolymers of the present invention have superior notched Izod impact values as compared to the polyphenylene ether source material.

Although the above examples are directed to only a few of the very many variables which can be utilized in the practice of the present invention, it should be understood that the present invention is directed to a much broader variety of silicone-polyphenylene ether block copolymers and to methods of preparing such materials.

We claim:

1. Silicone-polyarylene ether block copolymer comprising by weight 30 to 99% of polyphenylene ether blocks comprising a plurality of structural units of the formula

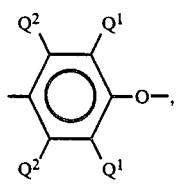

chemically combined through silicon-imide linkages with 1 to 70% of silicone blocks, where the silicon-imide linkages are the condensation products of reaction between anhydride groups of polyarylene ether modified with trimellitic anhydride acid chloride, or maleic anhydride, and the amine groups of an amine-terminated polydiorganosiloxane, wherein each of said structural units, independently, each $Q^1$ is halogen, primary or secondary lower alkyl, phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

2. A silicone-polyphenylene ether block copolymer in accordance with claim 1.

3. A polydimethylsiloxane-polyphenylene ether block copolymer in accordance with claim 1.

4. A silicone-polyphenylene ether block copolymer in accordance with claim 1, resulting from the reaction between an amino-terminated polydiorganosiloxane and an anhydride functionalized polyphenylene ether.

5. A blend of silicone and a polyarylene ether which is compatibilized with the silicone-polyarylene ether block copolymer of claim 1, where the amount of the silicone-polyarylene ether block copolymer does not exceed 20% by weight of the resulting compatibilized blend.

6. A compatibilized blend in accordance with claim 5, where the polyarylene ether is a polyphenylene ether.

7. A compatibilized blend in accordance with claim 6, where the silicone-polyarylene ether block copolymer is a silicone-polyphenylene ether block copolymer.

* * * * *